(12) United States Patent
Sim et al.

(10) Patent No.: US 11,948,745 B2
(45) Date of Patent: Apr. 2, 2024

(54) MULTILAYER CAPACITOR

(71) Applicant: SAMSUNG ELECTRO-MECHANICS CO., LTD., Suwon-si (KR)

(72) Inventors: Won Chul Sim, Suwon-si (KR); Soo Hwan Son, Suwon-si (KR); Young Ghyu Ahn, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 107 days.

(21) Appl. No.: 17/725,021

(22) Filed: Apr. 20, 2022

(65) Prior Publication Data

US 2023/0215632 A1 Jul. 6, 2023

(30) Foreign Application Priority Data

Dec. 31, 2021 (KR) .................. 10-2021-0193709

(51) Int. Cl.
*H01G 2/06* (2006.01)
*H01G 4/012* (2006.01)
(Continued)

(52) U.S. Cl.
CPC ............. *H01G 4/012* (2013.01); *H01G 4/232* (2013.01); *H01G 4/30* (2013.01); *H01G 2/065* (2013.01); *H01G 4/1227* (2013.01)

(58) Field of Classification Search
CPC .......... H01G 2/06; H01G 2/065; H01G 4/012; H01G 4/1227; H01G 4/224; H01G 4/232; H01G 4/30; H01G 4/12; H01G 4/005; H01G 4/1209; H01G 4/248; H05K 1/0287; H05K 1/181; H05K 2201/09609; H05K 2201/10015; H05K 2201/10734
(Continued)

(56) References Cited

U.S. PATENT DOCUMENTS

2008/0080121 A1 4/2008 Togashi
2008/0084651 A1 4/2008 Oguni et al.
(Continued)

FOREIGN PATENT DOCUMENTS

JP 2000195741 A * 7/2000 ............... H01G 4/12
JP 2008-91520 A 4/2008
(Continued)

*Primary Examiner* — Timothy J Thompson
*Assistant Examiner* — Guillermo J Egoavil
(74) *Attorney, Agent, or Firm* — Morgan, Lewis & Bockius LLP

(57) ABSTRACT

A multilayer capacitor includes: a body including a capacitance region in which at least one first internal electrode and at least one second internal electrode are alternately stacked on each other interposing at least one dielectric layer therebetween in a first direction; and first and second external electrodes disposed on the body and spaced apart from each other to be respectively connected to the at least one first internal electrode and the at least one second internal electrode, wherein the body includes a side margin overlapping none of the at least one first internal electrode and the at least one second internal electrode in the first direction, and a center width of the side margin is greater than a minimum width of the side margin.

24 Claims, 16 Drawing Sheets

(51) Int. Cl.
*H01G 4/12* (2006.01)
*H01G 4/232* (2006.01)
*H01G 4/30* (2006.01)

(58) Field of Classification Search
USPC ............ 361/778, 301.4, 306.3, 321.4, 321.2, 361/321.5; 174/260
See application file for complete search history.

(56) References Cited

U.S. PATENT DOCUMENTS

| | | |
|---|---|---|
| 2015/0103468 A1 | 4/2015 | Hwang |
| 2016/0233027 A1 | 8/2016 | Iijima et al. |
| 2021/0313113 A1* | 10/2021 | Hirao .................. H01G 4/1209 |

FOREIGN PATENT DOCUMENTS

| | | |
|---|---|---|
| JP | 4418969 B2 | 2/2010 |
| KR | 10-2005-0064802 A | 6/2005 |
| KR | 10-2015-0042500 A | 4/2015 |
| KR | 10-1736721 B1 | 5/2017 |

* cited by examiner

A-A'

MULTILAYER CAPACITOR

CROSS-REFERENCE TO RELATED APPLICATION(S)

This application claims the benefit of priority to Korean Patent Application No. 10-2021-0193709 filed on Dec. 31, 2021 in the Korean Intellectual Property Office, the disclosure of which is incorporated herein by reference in its entirety.

BACKGROUND

1. Field

The present disclosure relates to a multilayer capacitor.

2. Description of Related Art

A multilayer capacitor has been widely used as a component of an electronic device such as a computer, a personal digital assistant (PDA), a mobile phone because the multilayer capacitor has a small size, implements a high capacitance and may be easily mounted, and has also been widely used as a component of an electric device (including a vehicle) because the multilayer capacitor has high reliability and high strength characteristic.

The dielectric material having high dielectric constant, which may be used for the multilayer capacitor, may also have a piezoelectric property, and the multilayer capacitor may thus be affected by internal stress caused by an inverse piezoelectric (or electrostrictive) phenomenon when a voltage is applied thereto, and the internal stress may cause the multilayer capacitor to have a crack or a deteriorated withstand voltage.

SUMMARY

An aspect of the present disclosure may provide a multilayer capacitor having less cracks caused by internal stress and an increased withstand voltage characteristic.

According to an aspect of the present disclosure, a multilayer capacitor may include: a body including a capacitance region in which at least one first internal electrode and at least one second internal electrode are alternately stacked on each other interposing at least one dielectric layer therebetween in a first direction; and first and second external electrodes disposed on the body and spaced apart from each other to be respectively connected to the at least one first internal electrode and the at least one second internal electrode. The body includes a side margin overlapping none of the at least one first internal electrode and the at least one second internal electrode in the first direction, and a center width of the side margin is greater than a minimum width of the side margin.

According to another aspect of the present disclosure, a multilayer capacitor may include: a body including a capacitance region in which at least one first internal electrode and at least one second internal electrode are alternately stacked on each other interposing at least one dielectric layer therebetween in a first direction; and first and second external electrodes disposed on the body and spaced apart from each other to be respectively connected to the at least one first internal electrode and the at least one second internal electrode. The at least one first internal electrode and the at least one second internal electrode respectively include recession regions overlapping each other in the first direction.

According to another aspect of the present disclosure, a multilayer capacitor may include: a body including a capacitance region in which at least one first internal electrode and at least one second internal electrode are alternately stacked on each other interposing at least one dielectric layer therebetween in a first direction; and first and second external electrodes disposed on the body and spaced apart from each other to be respectively connected to the at least one first internal electrode and the at least one second internal electrode. The at least one first internal electrode includes a recession region including a 50% point of the body in a direction in which the first external electrode is facing toward the second external electrode.

According to still another aspect of the present disclosure, a multilayer capacitor may include: a body including a capacitance region in which at least one first internal electrode and at least one second internal electrode are alternately stacked on each other interposing at least one dielectric layer therebetween in a first direction; and first and second external electrodes disposed on the body and spaced apart from each other to be respectively connected to the at least one first internal electrode and the at least one second internal electrode. Minimum widths of the at least one first internal electrode and the at least one second internal electrode disposed in a middle portion of the body may be smaller than minimum widths of the at least one first internal electrode and the at least one second internal electrode disposed in a peripheral portion of the body in the first direction.

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Figure 1:
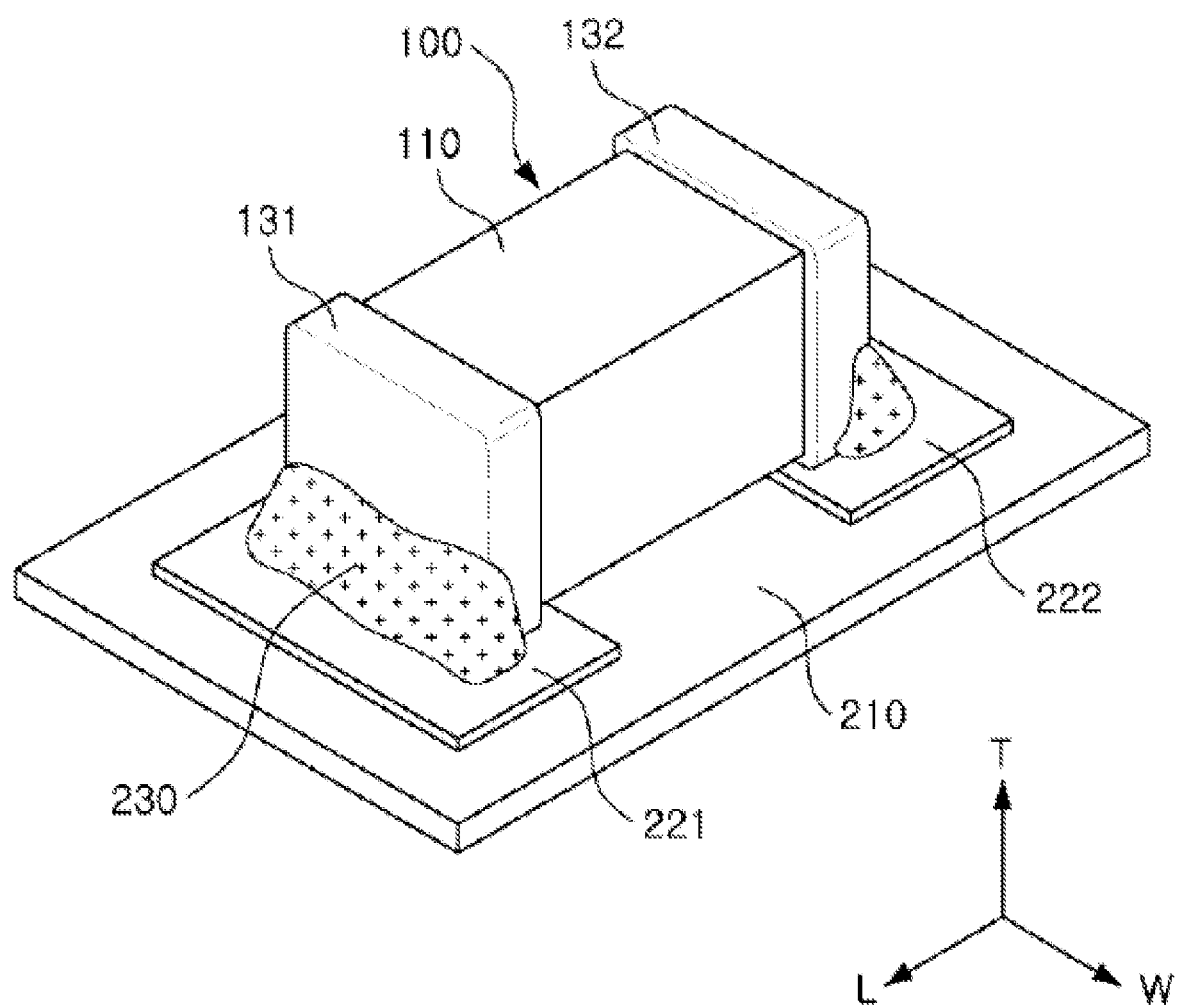
FIG. 1 is a perspective view showing a structure in which a multilayer capacitor according to an exemplary embodiment of the present disclosure is mounted on a board.

Hereinafter, exemplary embodiments of the present disclosure will now be described in detail with reference to the accompanying drawings.

In order to clearly describe exemplary embodiments of the present disclosure, directions of a hexahedron may be defined as follows: an L-direction, a W-direction and a T-direction in the drawings respectively refer to a length direction, a width direction and a thickness direction. Here, the thickness direction may refer to a stack direction (or first direction) in which dielectric layers are stacked on each other.

Hereinafter, the description describes a multilayer capacitor according to an exemplary embodiment of the present disclosure, and in particular, a multi-layer ceramic capacitor (MLCC). However, the present disclosure is not limited thereto.

Figure 2:
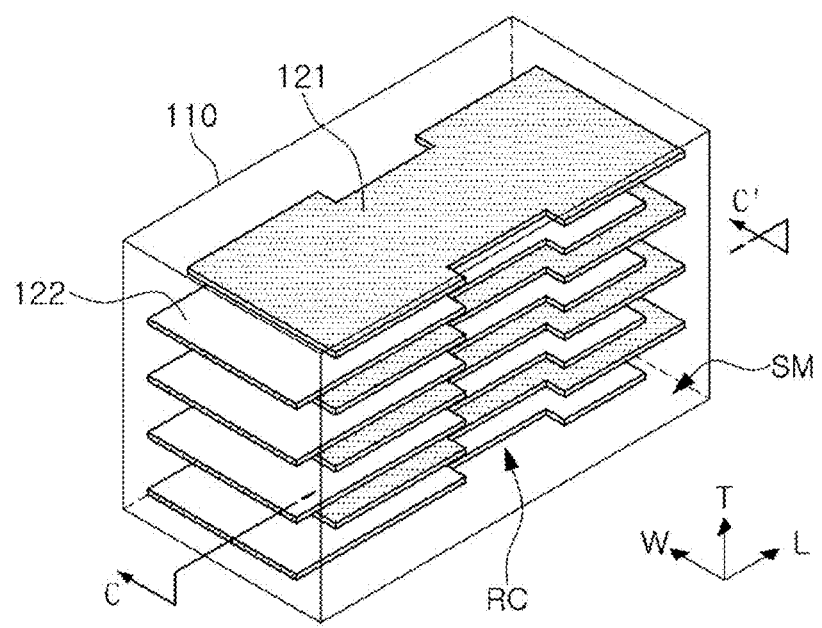
FIG. 2 is a perspective view showing the inside of a body of the multilayer capacitor according to an exemplary embodiment of the present disclosure.
Figure 3A:
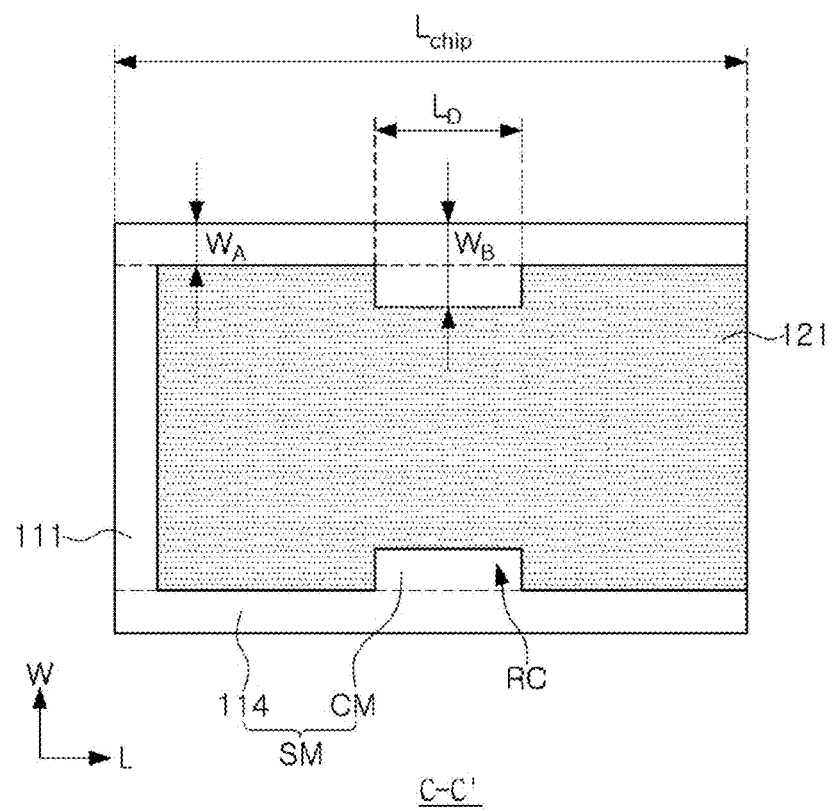
FIG. 3A is a cross-sectional view taken along line C-C' of FIG. 2.
Figure 4A:
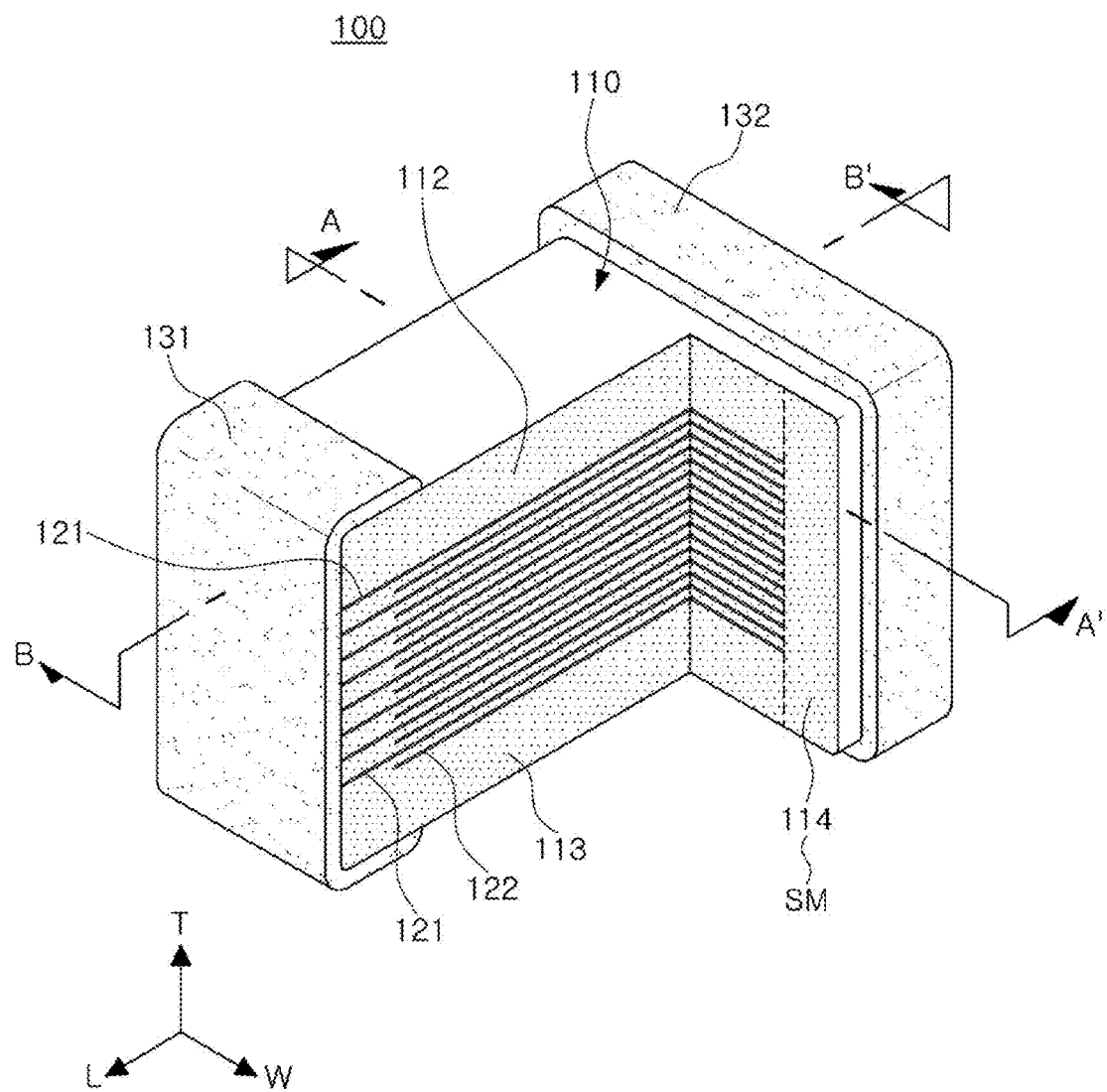
FIGS. 4A and 4B are perspective views each illustrating the multilayer capacitor according to an exemplary embodiment of the present disclosure and the inside thereof.
Figure 4B:
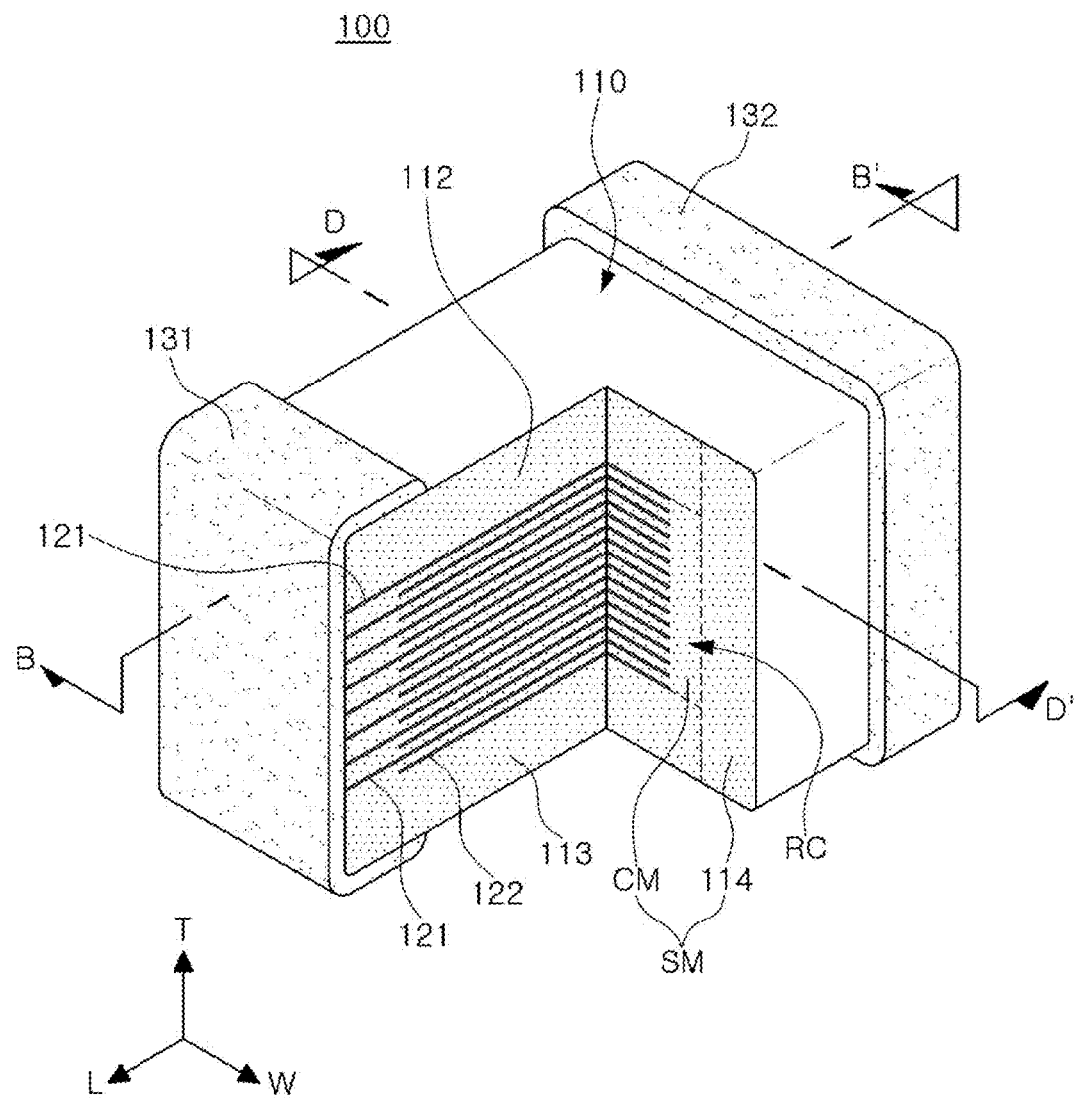
Figure 5A:
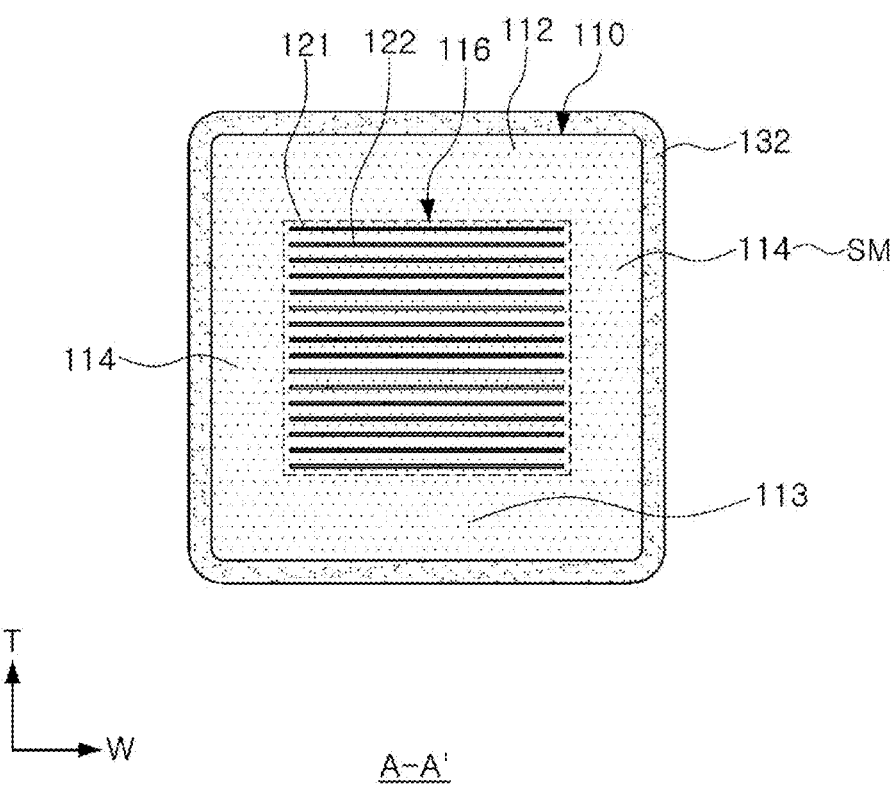
FIG. 5A is a cross-sectional view taken along line A-A' of FIG. 4A.
Figure 5B:
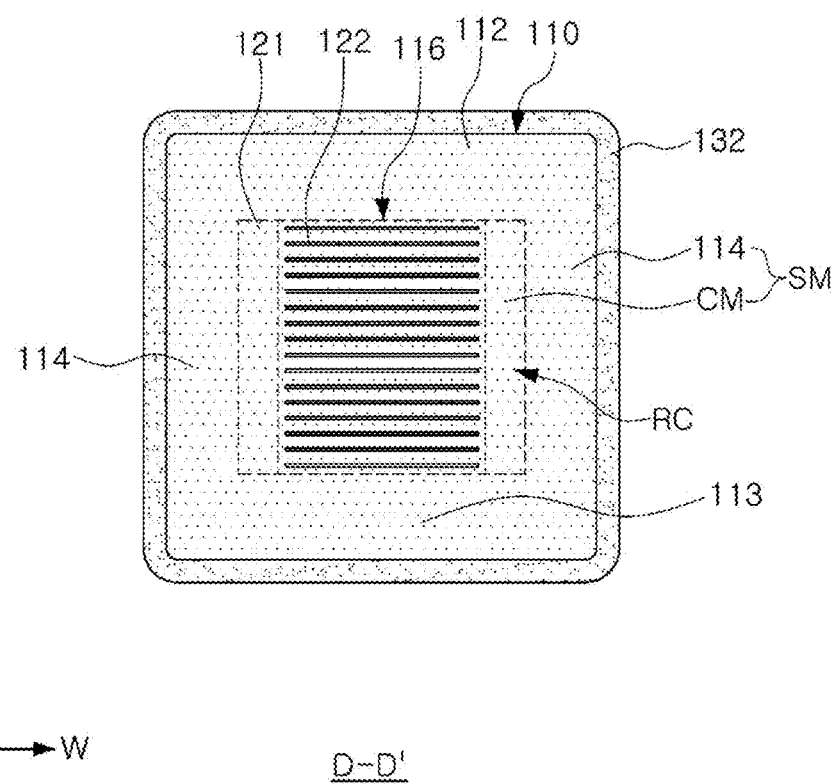
FIG. 5B is a cross-sectional view taken along line D-D' of FIG. 4B.
Figure 6:
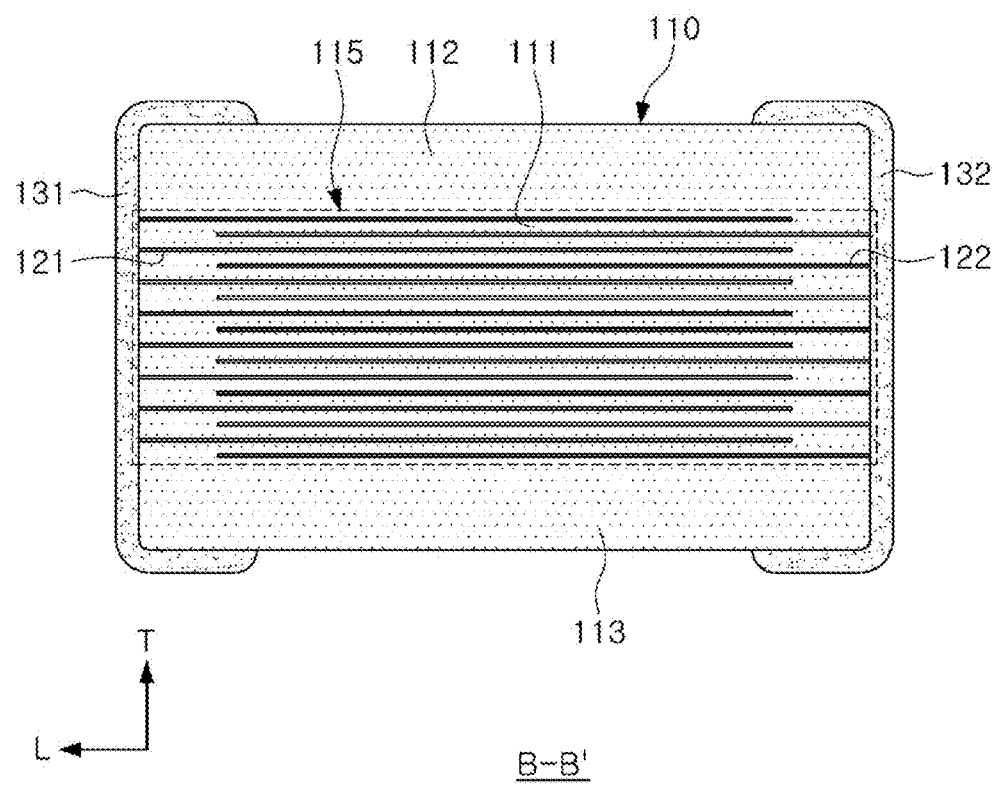
FIG. 6 is a cross-sectional view taken along line B-B' of FIG. 4A.

FIG. 1 is a perspective view showing a structure in which a multilayer capacitor according to an exemplary embodiment of the present disclosure is mounted on a board; FIG. 2 is a perspective view showing the inside of a body of the multilayer capacitor according to an exemplary embodiment of the present disclosure; FIG. 3A is a cross-sectional view taken along line C-C' of FIG. 2; FIGS. 4A and 4B are perspective views each illustrating the multilayer capacitor according to an exemplary embodiment of the present disclosure and the inside thereof; FIG. 5A is a cross-sectional view taken along line A-A' of FIG. 4A; FIG. 5B is a cross-sectional view taken along line D-D' of FIG. 4B; and FIG. 6 is a cross-sectional view taken along line B-B' of FIG. 4A.

Referring to FIGS. 1, 2, 3A, 4A, 4B, 5A and 6, a multilayer capacitor 100 according to an exemplary embodiment of the present disclosure may include a body 110, a first external electrode 131 and a second external electrode 132.

The body 110 may include a stack structure in which at least one first internal electrode 121 and at least one second internal electrode 122 are alternately stacked on each other interposing at least one dielectric layer 111 therebetween in a first direction (e.g., T direction).

For example, the body 110 may be a ceramic body formed by sintering the stack structure. Here, the at least one dielectric layer 111 disposed in the body 110 may be in a fired state, and a boundary between the adjacent dielectric layers may be integrated to each other, thus making it difficult to confirm a boundary therebetween without using a scanning electron microscope (SEM).

For example, the body 110 may have a shape of a hexahedron having two side surfaces in the length direction (L-direction or second direction), two side surfaces in the width direction (W-direction or third direction) and two side surfaces in the thickness direction (T-direction or first direction), and this hexahedron may have edges/corners polished to each have a round shape. However, the shape and dimension of the body 110 and the stack number of the dielectric layers 111 may not be limited to those described in this exemplary embodiment.

The at least one dielectric layer 111 may have a thickness arbitrarily changed based on a capacitance design of the multilayer capacitor 100, and may include a ceramic powder having high dielectric constant, e.g., barium titanate (BaTiO$_3$) based powder. However, the present disclosure is not limited thereto. In addition, various ceramic additives (e.g., MgO, Al$_2$O$_3$, SiO$_2$ or ZnO), organic solvents, plasticizers, binders, dispersants or the like may be added to the ceramic powder based on a required specification of the multilayer capacitor 100.

An average particle diameter of the ceramic powder used to form the at least one dielectric layer 111 may not be particularly limited, may be adjusted based on the required specification of the multilayer capacitor 100 (e.g., miniaturization and/or high capacitance required for a capacitor for an electronic device, or high withstand voltage characteristic and/or strong strength required for a capacitor for an electric device), and may be adjusted to 400 nm or less for example.

For example, the at least one dielectric layer 111 may be formed by applying a slurry including the powder such as the barium titanate (BaTiO$_3$) or the like, to a carrier film and then drying the same to prepare a plurality of ceramic sheets. The ceramic sheets may be formed by mixing the ceramic powder, a binder and a solvent with one another to prepare the slurry and then manufacturing the slurry in a shape of the sheet having a thickness of several micrometers by using a doctor blade method, and the present disclosure is limited thereto.

The at least one first internal electrode 121 and the at least one second internal electrode 122 may be formed as follows: conductive pastes each including a conductive metal are printed; arranged along the stack direction (e.g., T direction) of the dielectric layer to be exposed alternately from one side surface and the other side surface of the body 110 in the length direction (L-direction) of the body 110; and electrically insulated from each other by the dielectric layer interposed therebetween.

For example, the at least one first internal electrode 121 and the at least one second internal electrode 122 may each be formed of a conductive paste for an internal electrode, having an average particle size of 0.1 to 0.2 μm, and including 40 to 50 wt % of conductive metal powder, and the present disclosure is limited thereto. The conductive paste may include single metal powder such as nickel (Ni), copper (Cu), palladium (Pd), silver (Ag), lead (Pb) or platinum (Pt), or an alloy thereof, and the present disclosure is limited thereto.

For example, the conductive paste for an internal electrode may be applied to the ceramic sheets by using a printing method or the like, to form an internal electrode pattern. The printing method of the conductive paste may be a screen printing method, a gravure printing method or the like, and the present disclosure is not limited thereto. For example, two hundred or three hundred ceramic sheets on each of which the internal electrode pattern is printed may be stacked, pressed and sintered to manufacture the body 110.

A capacitance of the multilayer capacitor 100 may be proportional to an area in which the at least one first internal electrode 121 and the at least one second internal electrode 122 overlap each other in the stack direction (e.g., T direction), proportional to a total stack number of the at least one first internal electrode 121 and the at least one second internal electrode 122, and inversely proportional to a distance between the at least one first internal electrode 121 and the at least one second internal electrode 122. The distance may be substantially equal to each thickness of the at least one dielectric layer 111.

The multilayer capacitor 100 may have a larger capacitance compared to its thickness as the distance between the at least one first internal electrode 121 and the at least one second internal electrode 122 is smaller. On the other hand, a withstand voltage of the multilayer capacitor 100 may be higher as the distance is increased. Therefore, the distance may be adjusted based on the required specification of the multilayer capacitor 100 (e.g., miniaturization and/or high capacitance required for a capacitor for an electronic device, or high withstand voltage characteristic and/or strong strength required for a capacitor for an electric device). Each thickness of the at least one first internal electrode 121 and the at least one second internal electrode 122 may also be changed based on the above distance.

For example, the multilayer capacitor 100 may be designed so that the distance between the at least one first internal electrode 121 and the at least one second internal electrode 122 are greater than twice the thickness of each electrode when required to have the high withstand voltage characteristic and/or the strong strength. For example, the multilayer capacitor 100 may be designed so that each thickness of the at least one first internal electrode 121 and the at least one second internal electrode 122 is 0.4 µm or less and the total stack number thereof is 400 or more when required to have the miniature size and/or the high capacitance.

The first and second external electrodes 131 and 132 may be disposed on the body 110 while being spaced apart from each other to be respectively connected to the at least one first internal electrode 121 and the at least one second internal electrode 122.

For example, the first and second external electrodes 131 and 132 may each be formed by using a method of dipping the external electrodes into a paste including a metal component, a method of printing the conductive paste, a sheet transfer method, a pad transfer method, a sputter plating method, an electrolytic plating method, etc. For example, the first and second external electrodes 131 and 132 may respectively include a fired layer formed by firing the paste and a plating layer formed on an outer surface of the fired layer, and may further include a conductive resin layer disposed between the fired layer and the plating layer. For example, the conductive resin layer may be formed as a thermosetting resin such as epoxy includes a conductive particle. The metal component may be a single component such as copper (Cu), palladium (Pd), platinum (Pt), gold (Au), silver (Ag), lead (Pb) or tin (Sn), or an alloy thereof, and the present disclosure is not limited thereto.

The multilayer capacitor 100 may be mounted or embedded in a board 210, and connected to first and second pads 221 and 222 positioned on a board 210 through the first and second external electrodes 131 and 132, thus being electrically connected to a circuit (e.g., integrated circuit or processor) electrically connected to the board 210.

Solders 230 may respectively be disposed in contact with the first and second external electrodes 131 and 132 and the first and second pads 221 and 222 through a reflow process to bond the external electrodes and the pads to each other in a state where the first and second external electrodes 131 and 132 of the multilayer capacitor 100 are respectively positioned on the first and second pads 221 and 222 of the board 210. The solder 230 may have a melting point lower than that of copper (Cu) which may be included in the first or second external electrode 131 or 132, and may include tin (Sn) or a tin-based alloy.

Referring to FIGS. 4A, 4B, 5A, 5B and 6, the body 110 may include an upper cover layer 112, a lower cover layer 113 and a core region 115, and the core region 115 may include a side margin SM and a capacitance region 116.

The upper and lower cover layers 112 and 113 may be disposed to interpose the core region 115 therebetween in the first direction (e.g., T direction) and may each have a thickness greater than that of the at least one dielectric layer 111.

Each of the upper and lower cover layers 112 and 113 may prevent an external environmental factor (e.g., moisture, plating solution or foreign material) from infiltrating into the core region 115, may protect the body 110 from external impact, and may also improve a bending strength of the body 110.

For example, the upper and lower cover layers 112 and 113 may respectively include the same material or a different material (e.g., thermosetting resin such as epoxy resin) from the at least one dielectric layer 111.

The capacitance region 116 may include a portion between the at least one first internal electrode 121 and the at least one second internal electrode 122, thus forming the capacitance of the multilayer capacitor 100.

The capacitance region 116 may include the stack structure in which the at least one first internal electrode 121 and the at least one second internal electrode 122 are alternately stacked on each other interposing the at least one dielectric layer 111 therebetween in the first direction (e.g., T direction), and may have the same size as the stack structure.

The side margin SM may be a portion between each boundary line M of the at least one first internal electrode 121 and the at least one second internal electrode 122 and the surface of the body 110. That is, the side margin SM may overlap none of the at least one first internal electrode 121 and the at least one second internal electrode 121 in the first direction (e.g., T direction).

The plurality of side margins SM may be disposed to interpose the capacitance region 116 therebetween in a second direction (e.g., a W direction) perpendicular to the first direction (e.g., a T direction).

The plurality of side margins SM may prevent the at least one first internal electrode 121 and the at least one second internal electrode 122 from being exposed from the surface of the body 110 in the second direction (e.g., the W direction), and may thus prevent the external environmental factor (e.g., moisture, plating solution or foreign material) from infiltrating into the at least one first internal electrode 121 and the at least one second internal electrode 122 through the surface of the body in the second direction, thereby improving the reliability and lifespan of the multilayer capacitor 100.

In addition, the at least one first internal electrode 121 and the at least one second internal electrode 122 may each be efficiently expanded in the second direction due to the plurality of side margins SM, and the plurality of side margins SM may thus allow the area in which the at least one first internal electrode 121 and the at least one second internal electrode 122 overlap each other to be increased, thereby contributing to improvement in capacitance of the portion 100 pre of the multilayer capacitor.

Figure 8A:
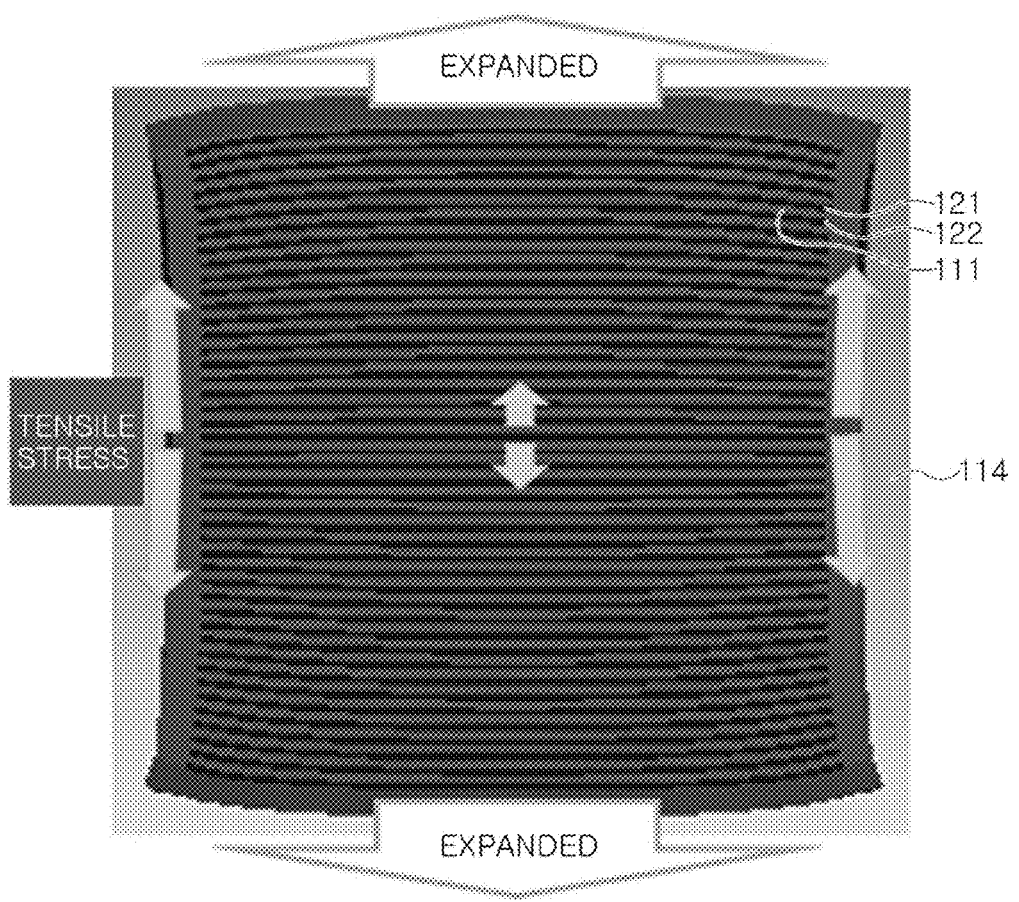
FIGS. 8A and 8B are cross-sectional views each illustrating a dispersion of the internal stress of the multilayer capacitor.
Figure 8B:
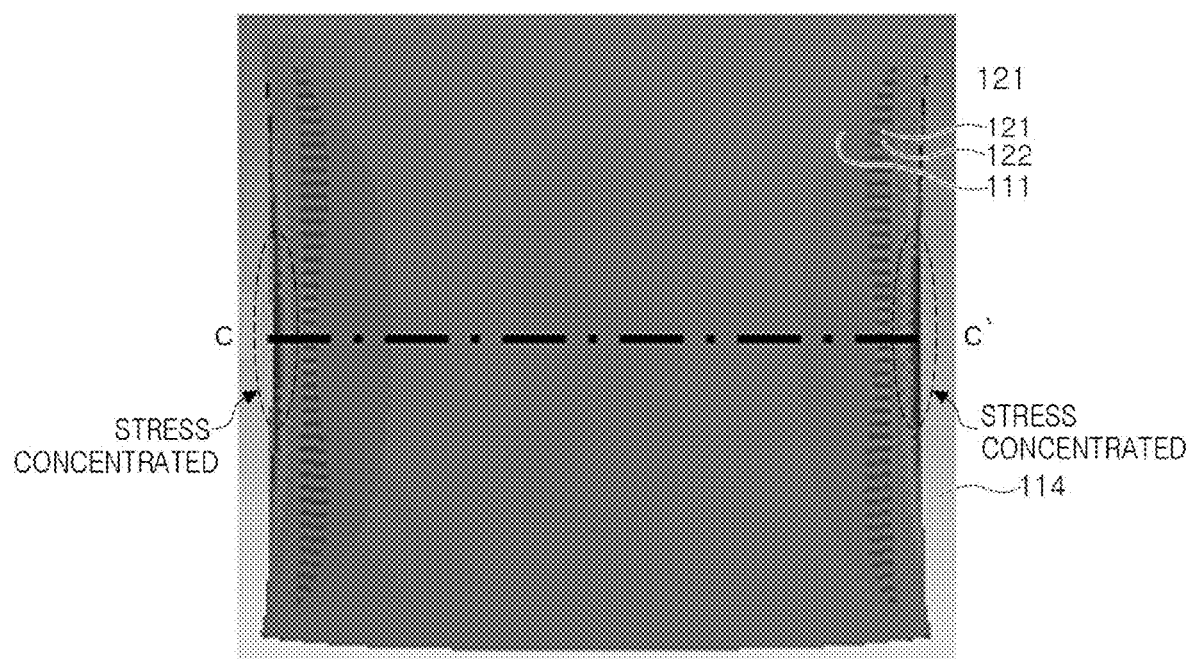

FIGS. 8A and 8B are cross-sectional views each illustrating a dispersion of the internal stress of the multilayer capacitor.

The higher dielectric constant of the at least one dielectric layer 111, the more capacitance relative of the multilayer capacitor 100 to unit size thereof, and the at least one dielectric layer 111 may include a material having a high dielectric constant, such as barium titanate ($BaTiO_3$). The material having a high dielectric constant, such as barium titanate ($BaTiO_3$), may also have a high piezoelectric property, and the multilayer capacitor 100 may have internal stress caused by an inverse piezoelectric (or electrostrictive) phenomenon when a voltage is applied thereto.

Referring to FIG. 8A, the internal stress may be formed in a direction (vertical direction) in which at least one first internal electrode 121 and at least one second internal electrode 122 are stacked on each other, and may be larger on a surface of the multilayer capacitor, in which the larger stress on the surface may cause tension and expansion of the multilayer capacitor.

The internal stress may include a vertical vector component and a horizontal vector component. As the vertical/horizontal vector components overlap each other in a position closer to the surface of the multilayer capacitor, the internal stress may be reinforced rather than offset. The internal stress of the multilayer capacitor may thus be the highest on the side surface of the multilayer capacitor.

FIG. 8B illustrates that the internal stress may be largest when concentrated on the side surface of the multilayer capacitor. The concentrated internal stress may cause a crack or an electrical bottleneck point (e.g., pore or unstable boundary of the internal electrode).

Referring back to FIGS. 2, 3A, 4A, 4B, 5A and 5B, a center width $W_B$ of the side margin SM may be greater than a minimum width $W_A$ of the side margin SM. Alternatively, the at least one first internal electrode 121 and the at least one second internal electrode 122 may respectively include recession regions RC overlapping each other in the first direction (e.g., T direction).

Accordingly, the center of the side margin SM and the recession region RC may efficiently disperse the concentrated internal stress, thereby preventing occurrence of the crack and the electrical bottleneck point caused by the internal stress concentrated on the side margin SM.

The center width $W_B$ of the side margin SM may be measured as an average width at multiple points between two points where a width of the side margin SM in the L direction rapidly changes, and the minimum width $W_A$ of the side margin SM may be measured as an average width at multiple points outside the two points having rapidly changing widths in the L direction, based on a length-width (LW) cross section exposed after cutting or grinding the body 110 in an XY plane including a center of the body 110. The center width $W_B$ of the side margin SM and the minimum width $W_A$ of the side margin SM may be measured through analysis using at least one of the transmission electron microscopy (TEM), the atomic force microscope (AFM), the scanning electron microscope (SEM), the optical microscope and the surface profiler. Other measurement methods and/or tools appreciated by one of ordinary skill in the art, even if not described in the present disclosure, may also be used.

For example, the side margin SM may include a side margin layer 114 and a central margin portion CM. When positioned on each of two surfaces of the body 110 in the W direction, the side margin SM may include the plurality of side margin layers 114 and the plurality of central margin portions CM.

The side margin layer 114 may provide the surface of the body 110, and may have a thickness equal to the minimum width $W_A$ of the side margin SM. The plurality of side margin layers 114 may be disposed to have the capacitance region 116 interposed therebetween. For example, the side margin layer 114 may include a barium titanate (BaTiO$_3$)-based ceramic material, and may be formed in a manner similar to that of the at least one dielectric layer 111 (however, stacked in a different direction).

The central margin portion CM may be disposed between the center of the side margin layer 114 and the capacitance region 116, and the at least one dielectric layer 111 included in the capacitance region 116 may be partially disposed in the central margin portion CM.

For example, the central margin portion CM may include a portion of the at least one dielectric layer 111, which overlaps none of the at least one first internal electrode 121 and the at least one second internal electrode 122 in the first direction (e.g., T direction). Accordingly, the central margin portion CM may include an empty space having the same area as an area in which either the at least one first internal electrode 121 or the at least one second internal electrode 122 is not disposed on the upper surface and/or lower surface of the at least one dielectric layer 111, and the empty space may be a free space when the at least one dielectric layer 111 is minutely moved in the central margin portion CM because the internal stress is concentrated in the center of the side margin SM. Accordingly, the central margin portion CM may efficiently relieve the internal stress concentrated at the center of the side margin SM.

A center of an outer surface of the side margin layer 114, on which the internal stress may be concentrated, may be a surface of the body 110, closest to the recession region RC among the surfaces of the body 110, and may not be connected to a conductive structure (e.g., external electrode, via electrode or terminal).

The center of the side margin SM, on which the internal stress may be concentrated, may include a 50% point of the body 110 in a direction (e.g., L direction) in which the first external electrode 131 is facing toward the second external electrode 132. Accordingly, the central margin portion CM and the recession region RC may include the 50% point of the body 110 in the direction (e.g., L direction) in which the first external electrode 131 is facing toward the second external electrode 132, thereby efficiently dispersing/relieving the concentrated internal stress.

The central margin portion CM may have a shape of a pillar extending in the first direction (e.g., T direction). FIG. 8A illustrates that tensile stress occurs in the vertical direction by the internal stress concentrated on the side surface of the body. Here, the central margin portion CM may extend in the same direction as the direction of the tensile stress occurring by the internal stress concentrated on the side surface, thereby efficiently dispersing/relieving the tensile stress.

For example, a length of the central margin portion CM and a length $L_D$ of the recession region RC, in the direction (e.g., L direction) in which the first and second external electrodes 131 and 132 face each other, may each be greater than 0.25 times and less than 0.75 times a length $L_{chip}$ of the body 110. Accordingly, the side margin SM and the recession region RC may stably secure reliability in dispersing/relieving the internal stress, while hardly affecting the capacitance of the capacitor region 116. When using a method similar to the method of measuring the center width $W_B$ and the minimum width $W_A$ of the side margin SM, the length $L_D$ may be measured as an average length of the recession region RC, based on the length-width (LW) cross section including the center of the body 110.

The minimum width $W_A$ of the side margin SM may be a width of the 10% point and/or 90% point of the body 110 in the direction (e.g., L direction) in which the first external electrode 131 is facing toward the second external electrode 132. Accordingly, the center width $W_B$ of the side margin SM may be greater than the width of the 10% point and/or the 90% point of the body 110.

Figure 7:
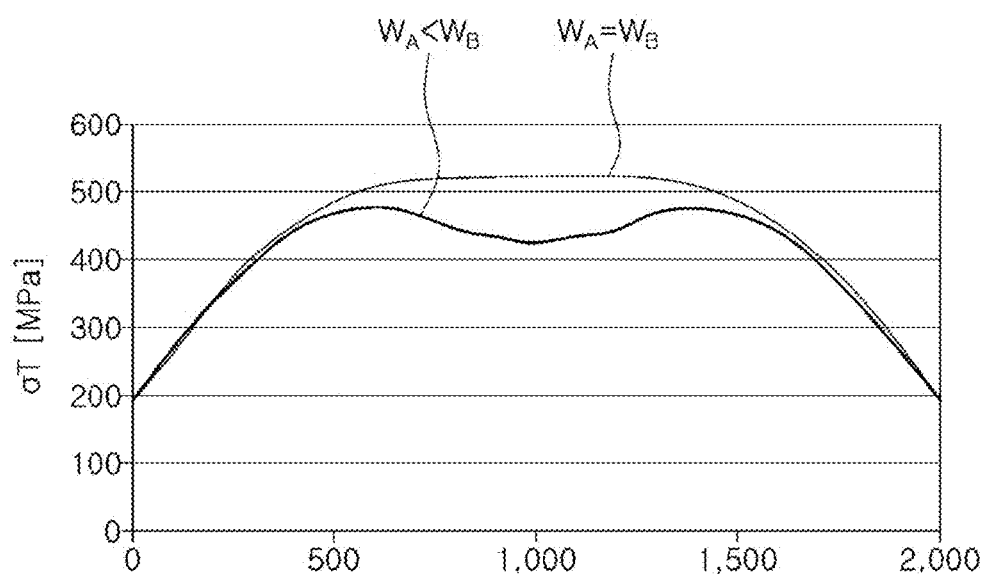
FIG. 7 is a graph showing internal stress of the multilayer capacitor according to an exemplary embodiment of the present disclosure.

FIG. 7 is a graph showing internal stress of the multilayer capacitor according to an exemplary embodiment of the present disclosure.

A horizontal axis of the graph shown in FIG. 7 indicates a position of the body, having a length of 2.0 mm, in the L direction, and a vertical axis of the graph indicates internal stress δ T for each position of the body in the L direction as the voltage is applied to the first and second external electrodes. Referring to FIG. 7, in a first case where the center width $W_B$ of the side margin SM and the minimum width $W_A$ are the same ($W_A=W_B$), a point at which the internal stress δ T has a maximum value may be the 50% point of the body in the L direction.

In a second case where the center width $W_B$ of the side margin SM is greater than the minimum width $W_A$ (i.e., $W_A<W_B$), the point at which the internal stress δ T has the maximum value is about the 30% point and about 70% point of the body in the L direction. That is, the point at which the stress caused by the voltage applied to the first and second external electrodes has the maximum value in the side margin may be different from the center (i.e., 50% point) of the side margin.

In addition, the maximum value of the internal stress δ T in the second case ($W_A<W_B$) may be lower than that in the first case ($W_A=W_B$). Therefore, the multilayer capacitor according to an exemplary embodiment of the present disclosure may efficiently disperse/relieve the internal stress concentrated on the 50% point of the body in the L direction.

FIGS. 3B, 3C, 3D and 3E are cross-sectional views each illustrating modified structures of the side margin and recession region of the multilayer capacitor according to another exemplary embodiment of the present disclosure.

Figure 3B:
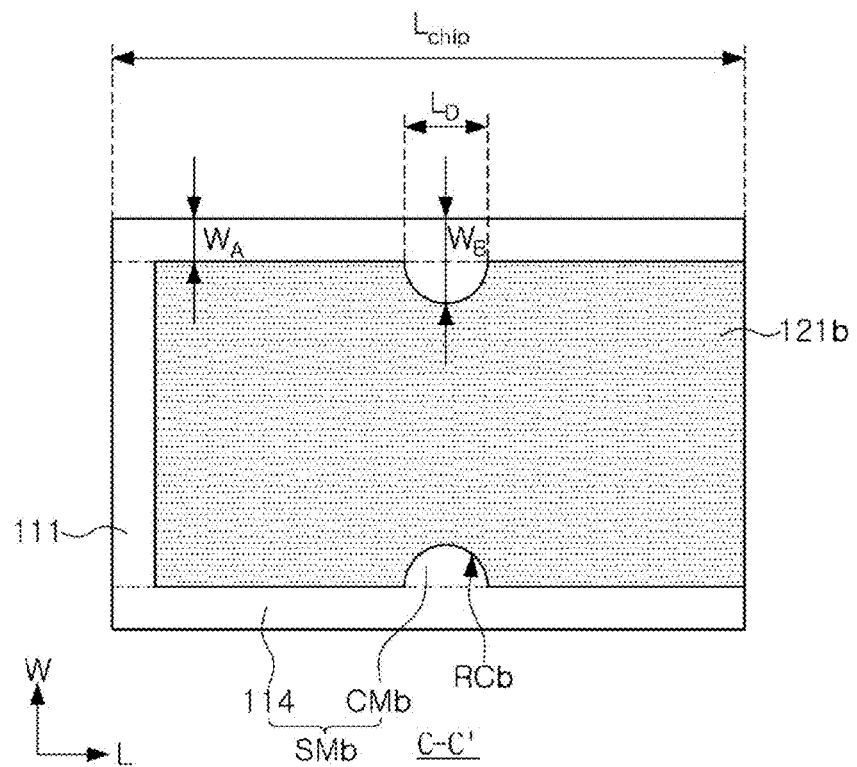
FIGS. 3B, 3C, 3D, and 3E are cross-sectional views each illustrating modified structures of the side margin and recession region of the multilayer capacitor according to another exemplary embodiment of the present disclosure.

Referring to FIG. 3A, the central margin portion CM and the recession region RC may each have an angled shape; and referring to FIG. 3B, cross sections of the central margin portion CMb of a side margin SMb and recession region RCb of a multilayer capacitor 100b according to another exemplary embodiment of the present disclosure may each have a semicircular shape.

Referring to FIGS. 3A and 3B, the side margins SM and SMb may each protrude from its center toward the at least one first internal electrode 121 or the at least one second internal electrode 122.

Figure 3C:
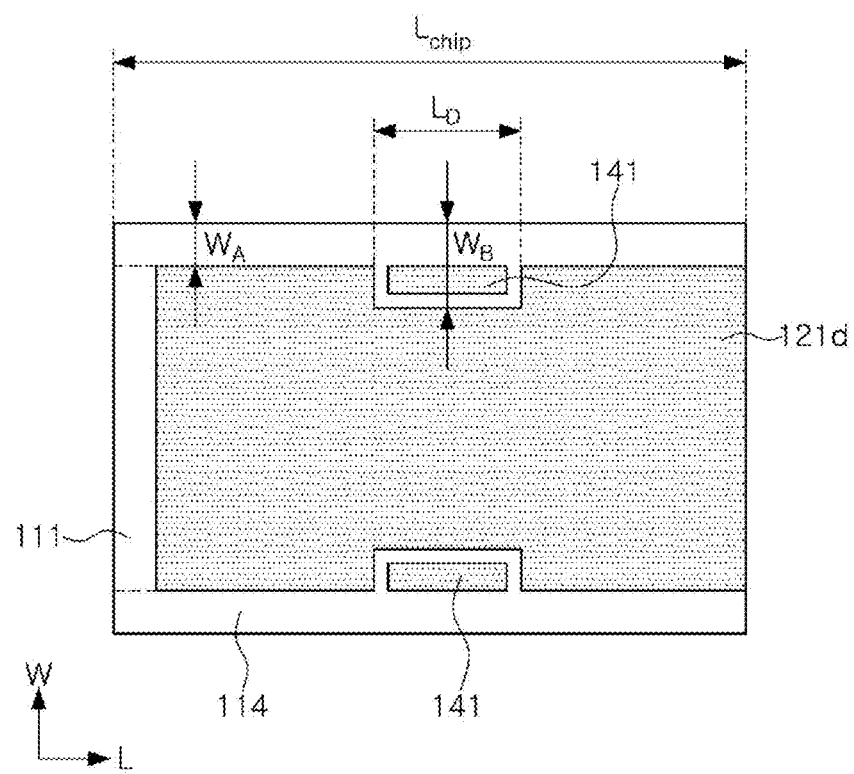
Figure 3D:
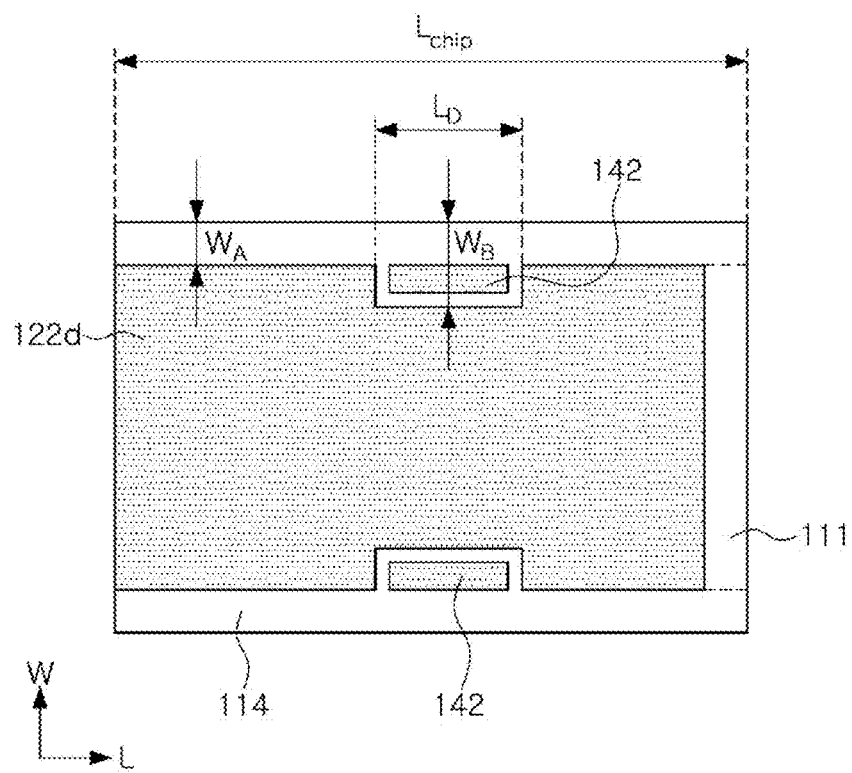

Referring to FIGS. 3A, 3C and 3D, a multilayer capacitor 100d according to another exemplary embodiment of the present disclosure may further include a first dummy electrode 141 and a second dummy electrode 142. The first dummy electrode 141 of FIG. 3C and the second dummy electrode 142 of FIG. 3D may each be disposed in the central margin portion CMb and the recession region RCb of FIG. 3A. The first dummy electrode 141 may be surrounded by at least one first internal electrode 121d and spaced apart from the at least one first internal electrode 121d The second dummy electrode 142 may be surrounded by at least one second internal electrode 122d and spaced apart from the at least one second internal electrode 122d.

The first and second dummy electrodes 141 and 142 may include the same material as the at least one first internal electrode 121d and the at least one second internal electrode 122d and may be formed in the same manner, and the present disclosure is not limited thereto. An effect of the first or second dummy electrode 141 or 142 on the internal stress mechanism of the body may be greater than that of the at least one dielectric layer 111, and may be closer to that of the at least one first internal electrode 121d or the at least one second internal electrode 122d. Accordingly, the width $W_B$ and the length $L_D$ of FIG. 3A may become smaller when the first and second dummy electrodes 141 and 142 are further positioned in the body.

Figure 3E:
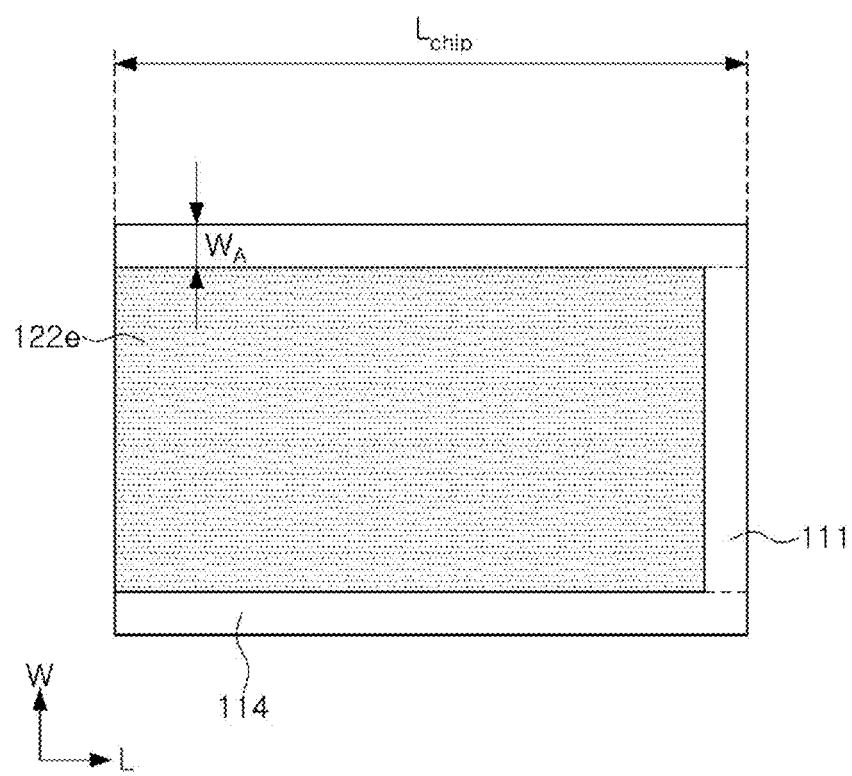

Referring to FIG. 3E, at least one second internal electrode 122e of a multilayer capacitor 100e according to another exemplary embodiment of the present disclosure may include none of the central margin portion CM and recession region RC of FIG. 3A. Here, at least one first internal electrode of the multilayer capacitor 100e may have the same shape as the at least one first internal electrode 121 of FIG. 3A or the at least one first internal electrode 121d of FIG. 3C. Accordingly, the at least one second internal electrode 122e may partially overlap the central margin portion CM and recession region RC of FIG. 3A or the first dummy electrode 141 of FIG. 3C in the first direction (e.g., T direction).

Figure 4C:
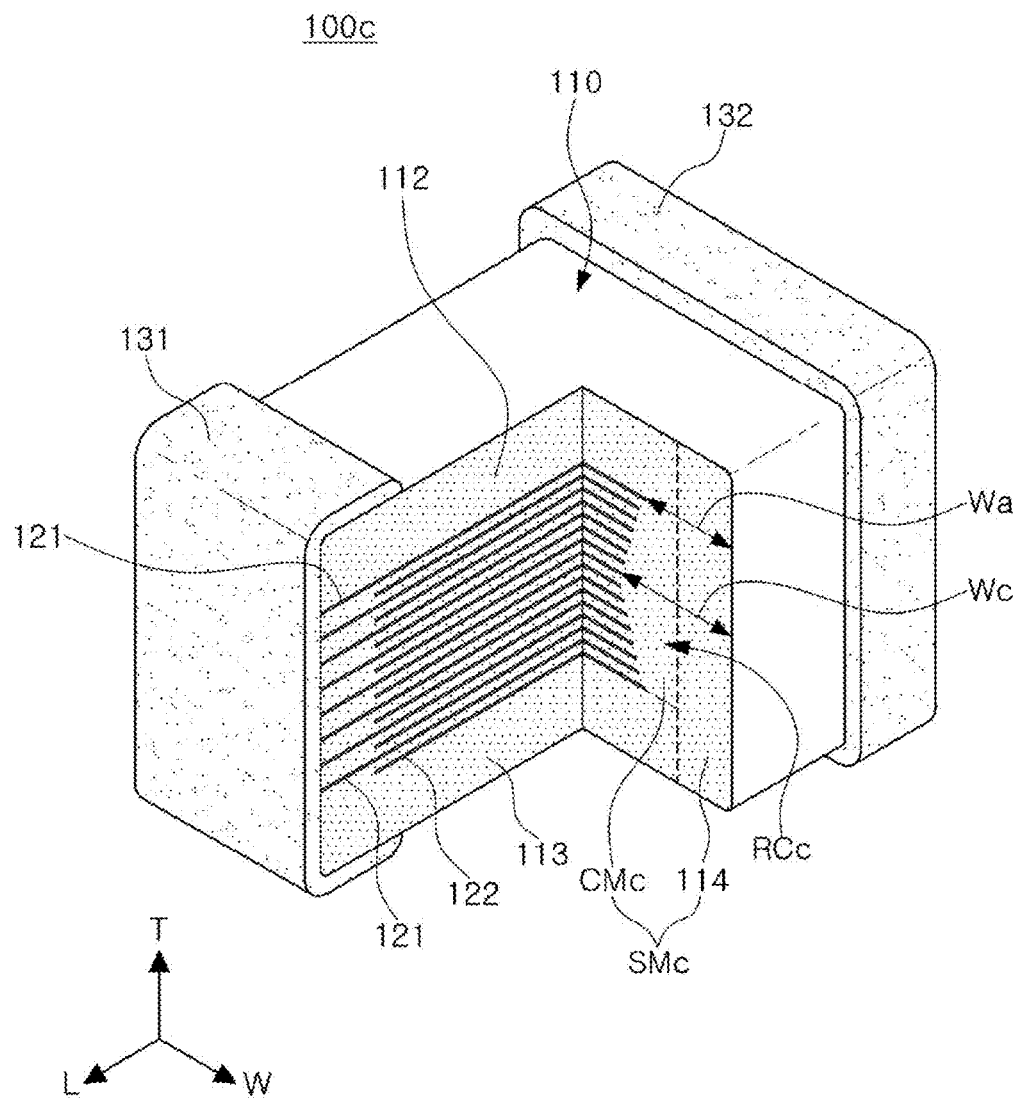
FIG. 4C is a perspective view showing an example of the modified structures of the side margin and recession region of the multilayer capacitor according to another exemplary embodiment of the present disclosure.

FIG. 4C is a perspective view showing an example of the modified structures of the side margin and recession region of the multilayer capacitor according to another exemplary embodiment of the present disclosure.

Referring to FIG. 4C, center point widths Wc of the central margin portion CWc of a side margin SMc and recession region RCc of the multilayer capacitor 100c according to another exemplary embodiment of the present disclosure may be greater than an upper/lower end width Wa of the side margin SMc. Accordingly, the center point widths Wc of the central margin portion CWc and the recession region RCc may be greater than widths of the ⅓ point and ⅔ point of the body 110 in the first direction (e.g., T direction).

In one exemplary embodiment of the present disclosure, minimum widths of the at least one first internal electrode 121 and the at least one second internal electrode 122 disposed in a middle portion (e.g., an internal electrode corresponding to the center point widths Wc) of the body 110 may be smaller than minimum widths of the at least one first internal electrode 121 and the at least one second internal electrode 122 disposed in a peripheral portion (e.g., an internal electrode corresponding to the upper/lower end width Wa of the side margin SMc) of the body 110 in the first direction (e.g., T direction).

In this embodiment, from the peripheral portion to the middle portion of the body 110 in the first direction, the minimum widths of the at least one first internal electrode 121 and the at least one second internal electrode 122 may gradually decrease.

According to one embodiment, an electrode width may refer to a width of an internal electrode and may be measured as an average width in the W-direction at multiple points of equal intervals (or non-equal intervals, alternatively) on a particular region of the internal electrode, based on a length-width (LW) cross section exposed after cutting or grinding the body 110 in an XY plane including a center of the body 110. In one example, an optical microscope or a scanning electron microscope (SEM) may be used in the measurement, although the present disclosure is not limited thereto. Other measurement methods and/or tools appreciated by one of ordinary skill in the art, even if not described in the present disclosure, may also be used.

The internal stress may be dispersed in a state of being concentrated on a center of the side margin SMc, and the shapes of the central margin CMc and the recession region RCc may reduce a distance deviation from the center of the side margin SMc to the internal electrode, thereby increasing an efficiency of dispersing the internal stress.

When using a method similar to the method of measuring the center width $W_B$ and the minimum width $W_A$ of the side margin SM, the center point widths Wc and the upper/lower end width Wa may be measured based on a width-thickness (WT) cross section including the center of the body 110.

As set forth above, the multilayer capacitor according to an exemplary embodiment of the present disclosure may have the less cracks caused by the internal stress and the increased withstand voltage characteristic.

While the exemplary embodiments have been shown and described above, it will be apparent to those skilled in the art that modifications and variations could be made without departing from the scope of the present disclosure as defined by the appended claims.

What is claimed is:

1. A multilayer capacitor comprising:
a body including a capacitance region in which at least one first internal electrode and at least one second internal electrode are alternately stacked on each other interposing at least one dielectric layer therebetween in a first direction; and
first and second external electrodes disposed on the body and spaced apart from each other to be respectively connected to the at least one first internal electrode and the at least one second internal electrode,
wherein the body includes a side margin overlapping none of the at least one first internal electrode and the at least one second internal electrode in the first direction,
a center width of the side margin is greater than a minimum width of the side margin, and
in a second direction in which the first and second external electrodes face each other, a point at which stress caused by a voltage applied to the first and second external electrodes has a maximum value in the side margin is different from a center point of the side margin.

2. The multilayer capacitor of claim 1, wherein the side margin includes:
a side margin layer having a surface of the body; and
a central margin portion disposed between a center of the side margin layer and the capacitance region, wherein the at least one dielectric layer included in the capacitance region is partially disposed in the central margin portion.

3. The multilayer capacitor of claim 1, wherein the side margin includes:
a plurality of side margin layers disposed to have the capacitance region interposed therebetween; and
a plurality of central margin portions disposed between respective centers of the plurality of side margin layers and the capacitance region.

4. The multilayer capacitor of claim 3, wherein each of the plurality of central margin portions has a shape of a pillar extending in the first direction.

5. The multilayer capacitor of claim 4, wherein each length of the plurality of central margin portions in a second direction in which the first and second external electrodes face each other is greater than 0.25 times and less than 0.75 times a length of the body in the second direction.

6. The multilayer capacitor of claim 4, wherein in the plurality of central margin portions, a width of a center point of each of the plurality of central margin portions is greater than widths of a ⅓ point and a ⅔ point of the body in the first direction.

7. The multilayer capacitor of claim 1, wherein in the side margin, the center width of the side margin is greater than widths of a 10% point and a 90% point of the body in a direction in which the first external electrode is facing toward the second external electrode.

8. The multilayer capacitor of claim 1, wherein the side margin includes a protruding portion protruding from a center thereof toward the at least one first internal electrode or the at least one second internal electrode, and
the protruding portion of the side margin has an angled shape.

9. The multilayer capacitor of claim 1, wherein the at least one dielectric layer and the side margin respectively include a barium titanate ($BaTiO_3$)-based ceramic material.

10. The multilayer capacitor of claim 1, wherein the at least one first internal electrode and the at least one second internal electrode respectively include recession regions overlapping each other in the first direction.

11. The multilayer capacitor of claim 10, wherein the body further includes:
a first dummy electrode disposed in the recession region of the at least one first internal electrode and spaced apart from the at least one first internal electrode; and
a second dummy electrode disposed in the recession region of the at least one second internal electrode and spaced apart from the at least one second internal electrode.

12. A multilayer capacitor comprising:
a body including a capacitance region in which at least one first internal electrode and at least one second internal electrode are alternately stacked on each other interposing at least one dielectric layer therebetween in a first direction; and
first and second external electrodes disposed on the body and spaced apart from each other to be respectively connected to the at least one first internal electrode and the at least one second internal electrode,
wherein the at least one first internal electrode and the at least one second internal electrode respectively include recession regions overlapping each other in the first direction, and
a center point width of one of the recession regions is greater than widths of a ⅓ point and a ⅔ point of the body in the first direction.

13. The multilayer capacitor of claim 12, wherein a center of a surface of the body, which is a closest surface to one of the recession regions among surfaces of the body, is not in direct contact with a conductive structure.

14. The multilayer capacitor of claim 12, wherein one of the recession regions includes a 50% point of the body in a direction in which the first external electrode is facing toward the second external electrode.

15. The multilayer capacitor of claim 12, wherein a length of one of the recession regions in a second direction in which the first and second external electrodes face each other is greater than 0.25 times and less than 0.75 times a length of the body in the second direction.

16. A multilayer capacitor comprising:
a body including a capacitance region in which at least one first internal electrode and at least one second internal electrode are alternately stacked on each other interposing at least one dielectric layer therebetween in a first direction; and
first and second external electrodes disposed on the body and spaced apart from each other to be respectively connected to the at least one first internal electrode and the at least one second internal electrode,
wherein the at least one first internal electrode includes a recession region including a 50% point of the body in a direction in which the first external electrode is facing toward the second external electrode, the body further includes a first dummy electrode disposed in the recession region of the at least one first internal electrode and spaced apart from the at least one first internal electrode, and the first dummy electrode partially overlaps the at least one second internal electrode in the first direction.

17. The multilayer capacitor of claim 16, wherein the recession region of the at least one first internal electrode partially overlaps the at least one second internal electrode in the first direction.

18. The multilayer capacitor of claim 16, wherein a side edge of the at least one second internal electrode is free of a recession region.

19. A multilayer capacitor comprising:
a body including a capacitance region in which at least one first internal electrode and at least one second internal electrode are alternately stacked on each other interposing at least one dielectric layer therebetween in a first direction; and first and second external electrodes disposed on the body and spaced apart from each other to be respectively connected to the at least one first internal electrode and the at least one second internal electrode in a second direction, wherein minimum widths of the at least one first internal electrode and the at least one second internal electrode disposed in a middle portion of the body are smaller than minimum widths of the at least one first internal electrode and the at least one second internal electrode disposed in a peripheral portion of the body in the first direction, the at least one first internal electrode and the at least one second internal electrode respectively include recession regions overlapping each other in the first direction, and the body further includes:
a first dummy electrode disposed in the recession region of the at least one first internal electrode and spaced apart from the at least one first internal electrode; and a second dummy electrode disposed in the recession region of the at least one second internal electrode and spaced apart from the at least one second internal electrode.

20. The multilayer capacitor of claim 19, wherein, from the peripheral portion of the body to the middle portion of the body in the first direction, the minimum widths of the at least one first internal electrode and the at least one second internal electrode gradually decrease.

21. The multilayer capacitor of claim 19, wherein, on each of the at least one first internal electrode and the at least one second internal electrode, an electrode width at a center region is smaller than electrode widths at both end regions.

22. The multilayer capacitor of claim 19, wherein each of the at least one first internal electrode and the at least one second internal electrode is divided into two end regions and a center region interposed between the two end regions, an electrode width of the center region is smaller than electrode widths of the two end regions, and the two end regions include a constant electrode width.

23. The multilayer capacitor of claim 22, wherein the center region includes a constant electrode width.

24. The multilayer capacitor of claim 22, wherein an electrode width of the center region varies, and a recession region at the center region defined by the varying electrode widths has a shape of a semicircle.

* * * * *